US012495239B2

(12) United States Patent
Ku

(10) Patent No.: US 12,495,239 B2
(45) Date of Patent: Dec. 9, 2025

(54) OPERATING STATE DETECTION USING PULSED ACOUSTIC SIGNALS

(71) Applicant: BOSE CORPORATION, Framingham, MA (US)

(72) Inventor: Emery M. Ku, Sudbury, MA (US)

(73) Assignee: Bose Corporation, Framingham, MA (US)

( * ) Notice: Subject to any disclaimer, the term of this patent is extended or adjusted under 35 U.S.C. 154(b) by 203 days.

(21) Appl. No.: 18/364,040

(22) Filed: Aug. 2, 2023

(65) Prior Publication Data

US 2025/0048013 A1 Feb. 6, 2025

(51) Int. Cl.
*H04R 29/00* (2006.01)
*H04R 1/10* (2006.01)

(52) U.S. Cl.
CPC ......... *H04R 1/1041* (2013.01); *H04R 1/1083* (2013.01); *H04R 29/001* (2013.01); *H04R 2460/01* (2013.01)

(58) Field of Classification Search
CPC ... H04R 1/1041; H04R 1/1083; H04R 29/001
See application file for complete search history.

(56) References Cited

U.S. PATENT DOCUMENTS

2005/0146388 A1* 7/2005 Braun ................. H04L 25/4902 332/106
2015/0063587 A1* 3/2015 Park ..................... H04R 1/1016 381/74
2018/0124532 A1 5/2018 Shetye et al.
2018/0249266 A1 8/2018 Termeulen et al.
2020/0186910 A1 6/2020 Kemmerer et al.
2022/0295183 A1* 9/2022 Chen .................... H04R 1/1041
2024/0107246 A1* 3/2024 Saux .................... H04R 1/1091

OTHER PUBLICATIONS

International Search Report and Written Opinion dated Oct. 23, 2024 for Application No. PCT/US2024/036614.

* cited by examiner

*Primary Examiner* — Simon King
(74) *Attorney, Agent, or Firm* — Patterson + Sheridan, LLP

(57) ABSTRACT

Aspects of the present disclosure provide techniques, including devices and systems implementing the techniques, for detecting a current state of a wearable audio device of a user. One example technique for detecting the current state of the wearable device generally includes transmitting, with a driver, at least one pulsed signal associated with the current state, receiving, at a microphone, a received signal of the at least one pulsed signal, determining an acoustic signal associated with the current state based on the received signal, determining a difference between the acoustic signal associated with the current state and a prior acoustic signal associated with a known state, and determining the current state of the wearable audio device based, at least in part, on a comparison of the difference to a threshold. In some aspects, the at least one pulsed signal comprises at least one pulsed ultrasonic wavelet.

21 Claims, 8 Drawing Sheets

OPERATING STATE DETECTION USING PULSED ACOUSTIC SIGNALS

FIELD

Aspects of the disclosure generally relate to wearable devices, and, more particularly, to techniques for detecting the operating state of a wearable device.

BACKGROUND

A wearable audio output device may be capable of detecting what state the wearable device is operating in. For example, the wearable device may determine whether the device is currently being worn on the head of a user. A wearable audio device may include several different types of sensors in order to determine the operating state. However, these various sensors add cost to the bill of materials of the wearable device, and occupy limited space on the wearable device. In addition, many approaches to on/off head state detection are often unreliable. As a result, implementing operating state detection in the wearable audio device may be costly, and the device may often incorrectly identify its operating state and take corresponding action, and thus negatively impact the experience of the user and/or the performance of the device.

Accordingly, methods for detecting the operating state of a wearable device, as well as apparatuses and systems configured to implement these methods, are desired.

SUMMARY

All examples and features mentioned herein can be combined in any technically possible manner.

Aspects of the present disclosure provide a method of detecting a current state of a wearable audio device of a user. The method includes transmitting, with a driver, at least one pulsed signal associated with the current state; receiving, at a microphone, a received signal of the at least one pulsed signal; determining an acoustic signal associated with the current state based on the received signal; determining a difference between the acoustic signal associated with the current state and a prior acoustic signal associated with a known state; and determining the current state of the wearable audio device based, at least in part, on a comparison of the difference to a threshold.

In aspects, the at least one pulsed signal includes at least one pulsed ultrasonic wavelet.

In aspects, the wearable audio device is in open-air in the known state.

In aspects, the received signal is received during a frame; and determining the acoustic signal associated with the current state includes taking an average of the received signal received during the frame and one or more prior received signals received during one or more prior frames; and determining the acoustic signal during only a portion of the frame based on the average of the received signal.

In aspects, the method further includes determining when the current state of the wearable audio device is settled by evaluating a stability of the difference over a period of time.

In aspects, the method further includes processing the received signal using a filter, the filter being configured to remove audio sound and environmental sound from the received signal.

In aspects, the at least one pulsed signal includes a first pulsed signal and a second pulsed signal; and an interval between the first pulsed signal and the second pulsed signal is configured to prevent interference to the received signal from the second pulsed signal.

In aspects, a fundamental frequency of the at least one pulsed signal and a shape of the at least one pulsed signal in a frequency domain are known.

In aspects, the difference is a root-mean-square (RMS) difference.

In aspects, the method further includes determining when there is an object between the driver and the microphone, wherein: the driver is included in a first cup of the wearable audio device; the microphone is included in a second cup of the wearable audio device; and the determining the current state of the wearable audio device is further based on the determining when the object is between the driver and the microphone.

Aspects of the present disclosure provide a system. The system includes a wearable audio device of a user, the wearable audio device including a microphone configured to measure ambient sound and a driver; and one or more processors coupled to the wearable audio device. The one or more processors are configured to: transmit, with the driver, at least one pulsed signal associated with a current state of the wearable audio device; receive, at the microphone, a received signal of the at least one pulsed signal; determine an acoustic signal associated with the current state based on the received signal; determine a difference between the acoustic signal associated with the current state and a prior acoustic signal associated with a known state; and determine the current state of the wearable audio device based, at least in part, on a comparison of the difference to a threshold.

In aspects, the at least one pulsed signal includes at least one pulsed ultrasonic wavelet.

In aspects, the received signal is received during a frame; and the one or more processor are configured to determine the acoustic signal associated with the current state by: taking an average of the received signal received during the frame and one or more prior received signals received during one or more prior frames; and determining the acoustic signal during only a portion of the frame based on the average of the received signal.

In aspects, the one or more processors are further configured to determine when the current state of the wearable audio device is settled by evaluating a stability of the difference over a period of time.

In aspects, the one or more processors are further configured to process the received signal using a filter, the filter being configured to remove audio sound and environmental sound from the received signal.

Aspects of the present disclosure provide a non-transitory computer-readable medium including computer-executable instructions that, when executed by one or more processors of a wearable audio device of a user, cause the wearable audio device to perform a method for detecting a current state of the wearable audio device. The method includes transmitting, with a driver, at least one pulsed signal associated with the current state; receiving, at a microphone, a received signal of the at least one pulsed signal; determining an acoustic signal associated with the current state based on the received signal; determining a difference between the acoustic signal associated with the current state and a prior acoustic signal associated with a known state; and determining the current state of the wearable audio device based, at least in part, on a comparison of the difference to a threshold.

In aspects, the at least one pulsed signal comprises at least one pulsed ultrasonic wavelet.

In aspects, the received signal is received during a frame; and determining the acoustic signal associated with the current state includes: taking an average of the received signal received during the frame and one or more prior received signals received during one or more prior frames; and determining the acoustic signal during only a portion of the frame based on the average of the received signal.

In aspects, the method further includes: determining when the current state of the wearable audio device is settled by evaluating a stability of the difference over a period of time.

In aspects, the method further includes: processing the received signal using a filter, the filter being configured to remove audio sound and environmental sound from the received signal.

Two or more features described in this disclosure, including those described in this summary section, may be combined to form implementations not specifically described herein.

The details of one or more implementations are set forth in the accompanying drawings and the description below. Other features, objects, and advantages will be apparent from the description and drawings, and from the claims.

BRIEF DESCRIPTION OF THE DRAWINGS

Like numerals indicate like elements.

DETAILED DESCRIPTION

Figure 1:
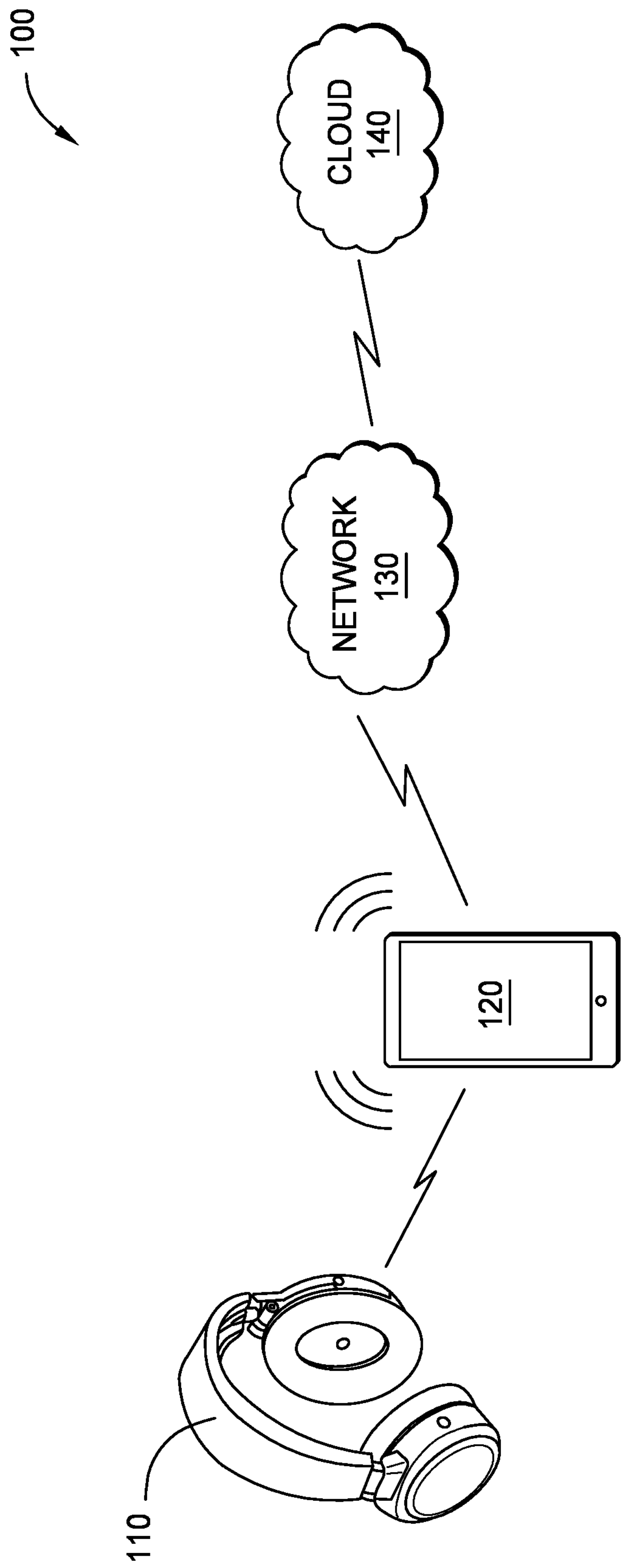
FIG. 1 illustrates an example system, in which aspects of the present disclosure may be implemented.

Certain aspects of the present disclosure provide techniques, including devices and system implementing the techniques, for detecting a current operating state of a wearable audio device of a user. Detecting the current operating state of the wearable device may involve transmitting pulsed signals using a driver (e.g., an electroacoustic transducer), measuring the received signals of the transmitted pulsed signals associated with the current state of the device at one or more microphones, and using the received signals to determine when the current state of the wearable device is the open-air state (e.g., when the device is off-head).

Wearable audio output devices help users enjoy high quality audio (e.g., provided audio from an audio source such as a mobile phone, tablet, or computer) and participate in productive voice calls. Many wearable audio output devices may also isolate users from the surrounding world to eliminate environmental distractions by using passive sound insulation, active noise reduction (ANR) (which may include or be referred to as active noise cancellation (ANC)), or both. However, wearable audio devices may suffer from several drawbacks which impact user safety and the ease of use of the devices. For example, controls (e.g., a power switch) mounted on or otherwise connected to a wearable device that are normally operated by a user upon either positioning the wearable device in, over, or around one or both ears, or removing it therefrom, are often undesirably cumbersome to use. The cumbersome nature of the controls often arises from the need to minimize the size and weight of such devices by minimizing the physical size of the controls. Also, controls of other devices with which a wearable device interacts (e.g., a mobile phone, tablet, or computer) are often inconveniently located relative to the wearable device and/or a user. Further, regardless of whether such controls are in some way carried by the wearable device or by another device with which the wearable device interacts, it is common for users to forget to operate these controls when they position the wearable device in, over, or around one or both ears, or remove it therefrom.

As a result of the drawbacks common with many wearable devices, the devices may include various enhancements to mitigate the drawbacks. For example, a wearable device may possess the ability to determine the positioning of an earpiece of a wearable device relative to a user's ear (e.g., the current operating state of the device). The positioning of an earpiece in, over, or around a user's ear, or "in the vicinity of a user's ear," may be referred to herein as an "on-head" operating state. Conversely, the positioning of an earpiece so that it is absent from a user's ear, or not in the vicinity of a user's ear, may be referred to as an "off-head" operating state.

Knowledge of a change in the operating state from on-head to off-head, or from off-head to on-head, may be utilized for different purposes. For example, features of the wearable device may be enabled or disabled according to a change of operating state. In a specific example, upon determining that at least one of the earpieces of a wearable device has been removed from a user's ear to become off-head, power supplied to the device may be reduced or terminated. Power control executed in this manner may result in longer durations between charging of one or more batteries used to power the device and can increase battery lifetime. Optionally, a determination that one or more earpieces have been returned to the user's ear may also be used to resume or increase the power supplied to the device. In addition, knowledge of the operating state of the wearable device may also be used to infer information about the acoustics of the wearable device to enable the device to deliver better filters for enhancing the audio and/or noise cancellation (e.g., ANC) of the wearable device, as well as facilitate a user's awareness (e.g., transparency mode) while wearing the device. In some cases, various interfaces (e.g., a capacitive touch interface) of the wearable device, as well as the audio output of the wearable device may also be controlled using knowledge of the on/off head state.

Many wearable devices may include several different types of sensors in order to determine the device operating state. However, these various sensors add cost to the bill of materials of the wearable device and occupy limited space on the wearable device. In addition, many approaches to on/off head state detection are often unreliable. For example, some wearable devices may employ a capacitive proximity sensor that may be used to determine the operating state of the device. However, the capacitive proximity sensor may not be calibrated appropriately and thus may not provide accurate information to the wearable device. As a result, the wearable device may incorrectly determine the device operating state. In another example, a wearable device may be a banded headset, and may include a right earpiece with a sensor and a left earpiece without a sensor. In this case, a user may don the left earpiece of the wearable device but may be holding onto the right earpiece with their hands. As a result, the banded headset may incorrectly determine, using the sensor on the right earpiece, that the banded headset is on-head, even though in reality, the right earpiece remains in the off-head state. In a further example, a wearable device may rely on an infra-red (IR) sensor directed at the location where an ear of the user is expected to be seen to determine the operating state of the device. However, the user may inadvertently hold a finger over the IR sensor, which may incorrectly interpret the finger of the user to signify that the wearable device is on-head. Further, some approaches to on/off head state detection may be intrusive to the user. For example, some methods that may be used to determine when a wearable device is on-head and well-sealed may involve using external or internal noise generated by the wearable device (e.g., by playing a tone). However, this external or internal noise is often audible to a user of the wearable device, and therefore may negatively impact the audio experience of the user. In addition, methods used to determine when a wearable device is on-head may rely on external sound. But, the occurrence (or lack thereof) of external sound is not controlled by the wearable device. As such, the wearable device may be unable to consistently determine the state of the wearable device when desired.

Therefore, implementing state detection in a wearable device may be costly, intrusive to the user, and may often result in incorrectly identified device operating states. The present disclosure may enable the wearable device of a user to correctly detect when a wearable device is in an open-air state (e.g., off-head and not blocked) inaudibly, without impacting the experience of a user of the wearable device. The present disclosure may also enable the wearable device to properly determine when the wearable device is in the open-air state using only the driver and microphone without the use of additional sensors which may be costly and occupy limited space. Certain aspects of the present disclosure may be implemented in conjunction with other methods for current operating state detection to help eliminate instances of incorrect device operating state detection.

An Example System

FIG. 1 illustrates an example system 100, in which aspects of the present disclosure are practiced. As shown, system 100 includes a wearable device 110 communicatively coupled with a computing device 120. The wearable device 110 may be configured to be worn by a user and may be a headset that includes two or more speakers and two or more microphones, as illustrated in FIG. 1. The computing device 120 is illustrated as a smartphone or a tablet computer wirelessly paired with the wearable device 110. At a high level, the wearable device 110 may play audio content transmitted from the computing device 120. The user may use the graphical user interface (GUI) on the computing device 120 to select the audio content and/or adjust settings of the wearable device 110. The wearable device 110 provides soundproofing, active noise cancellation, and/or other audio enhancement features to play the audio content transmitted from the computing device 120.

The wearable device 110 includes hardware and circuitry including processor(s)/processing system and memory configured to implement one or more sound management capabilities or other capabilities including, but not limited to, noise canceling circuitry (not shown) and/or noise masking circuitry (not shown), body movement detecting devices/sensors and circuitry (e.g., one or more accelerometers, one or more gyroscopes, one or more magnetometers, etc.), geolocation circuitry and other sound processing circuitry. The noise cancelling circuitry is configured to reduce unwanted ambient sounds external to the wearable device 110 by using active noise cancelling (also known as active noise reduction). The sound masking circuitry is configured to reduce distractions by playing masking sounds via the speakers of the wearable device 110. The movement detecting circuitry is configured to use devices/sensors such as an accelerometer, gyroscope, magnetometer, or the like to detect whether the user wearing the wearable device 110 is moving (e.g., walking, running, in a moving mode of transport, etc.) or is at rest and/or the direction the user is looking or facing. The movement detecting circuitry may also be configured to detect a head position of the user, as well as in augmented reality (AR) applications where an AR sound is played back based on a direction of gaze of the user.

In an aspect, the wearable device 110 is wirelessly connected to the computing device 120 using one or more wireless communication methods including, but not limited to, Bluetooth, Wi-Fi, Bluetooth Low Energy (BLE), other radio frequency (RF) based techniques, or the like. In certain aspects, the wearable device 110 includes a transceiver that transmits and receives data via one or more antennae in order to exchange audio data and other information with the computing device 120.

In an aspect, the wearable device 110 includes communication circuitry capable of transmitting and receiving audio data and other information from the computing device 120. The wearable device 110 also includes an incoming audio buffer, such as a render buffer, that buffers at least a portion of an incoming audio signal (e.g., audio packets) in order to allow time for retransmissions of any missed or dropped data packets from the computing device 120. For example, when the wearable device 110 receives Bluetooth transmissions from the computing device 120, the communication circuitry typically buffers at least a portion of the incoming audio data in the render buffer before the audio is actually rendered and output as audio to at least one of the transducers (e.g., audio speakers) of the wearable device 110. This is done to ensure that even if there are RF collisions that cause audio packets to be lost during transmission, there is time for the lost audio packets to be retransmitted by the computing device 120 before the lost audio packets have been rendered by the wearable device 110 for output by one or more acoustic transducers of the wearable device 110.

The wearable device 110 is illustrated as over-the-head headphones; however, the techniques described herein apply to other wearable devices, such as wearable audio devices, including any audio output device that fits around, on, in, or near an ear (including open-ear audio devices worn on the head or shoulders of a user) or other body parts of a user, such as head or neck. The wearable device 110 may take any form, wearable or otherwise, including standalone devices (including automobile speaker system), stationary devices (including portable devices, such as battery powered portable speakers), headphones (including over-ear headphones, on-ear headphones, in-ear headphones), earphones, earpieces, headsets (including virtual reality (VR) headsets and AR headsets), goggles, headbands, earbuds, armbands, sport headphones, neckbands, or eyeglasses. In certain aspects, the wearable device 110 may be implemented as a banded headset with two cups each configured to deliver audio output.

In certain aspects, the wearable device 110 is connected to the computing device 120 using a wired connection, with or without a corresponding wireless connection. The computing device 120 may be a smartphone, a tablet computer, a laptop computer, a digital camera, or other computing device that connects with the wearable device 110. As shown, the computing device 120 can be connected to a network 130 (e.g., the Internet) and may access one or more services over the network. As shown, these services can include one or more cloud services 140.

In certain aspects, the computing device 120 can access a cloud server in the cloud 140 over the network 130 using a mobile web browser or a local software application or "app" executed on the computing device 120. In certain aspects, the software application or "app" is a local application that is installed and runs locally on the computing device 120. In certain aspects, a cloud server accessible on the cloud 140 includes one or more cloud applications that are run on the cloud server. The cloud application may be accessed and run by the computing device 120. For example, the cloud application can generate web pages that are rendered by the mobile web browser on the computing device 120. In certain aspects, a mobile software application installed on the computing device 120 or a cloud application installed on a cloud server, individually or in combination, may be used to implement the techniques for low latency Bluetooth communication between the computing device 120 and the wearable device 110 in accordance with aspects of the present disclosure. In certain aspects, examples of the local software application and the cloud application include a gaming application, an audio AR or VR application, and/or a gaming application with audio AR or VR capabilities. The computing device 120 may receive signals (e.g., data and controls) from the wearable device 110 and send signals to the wearable device 110.

An Example Wearable Device

Figure 2:
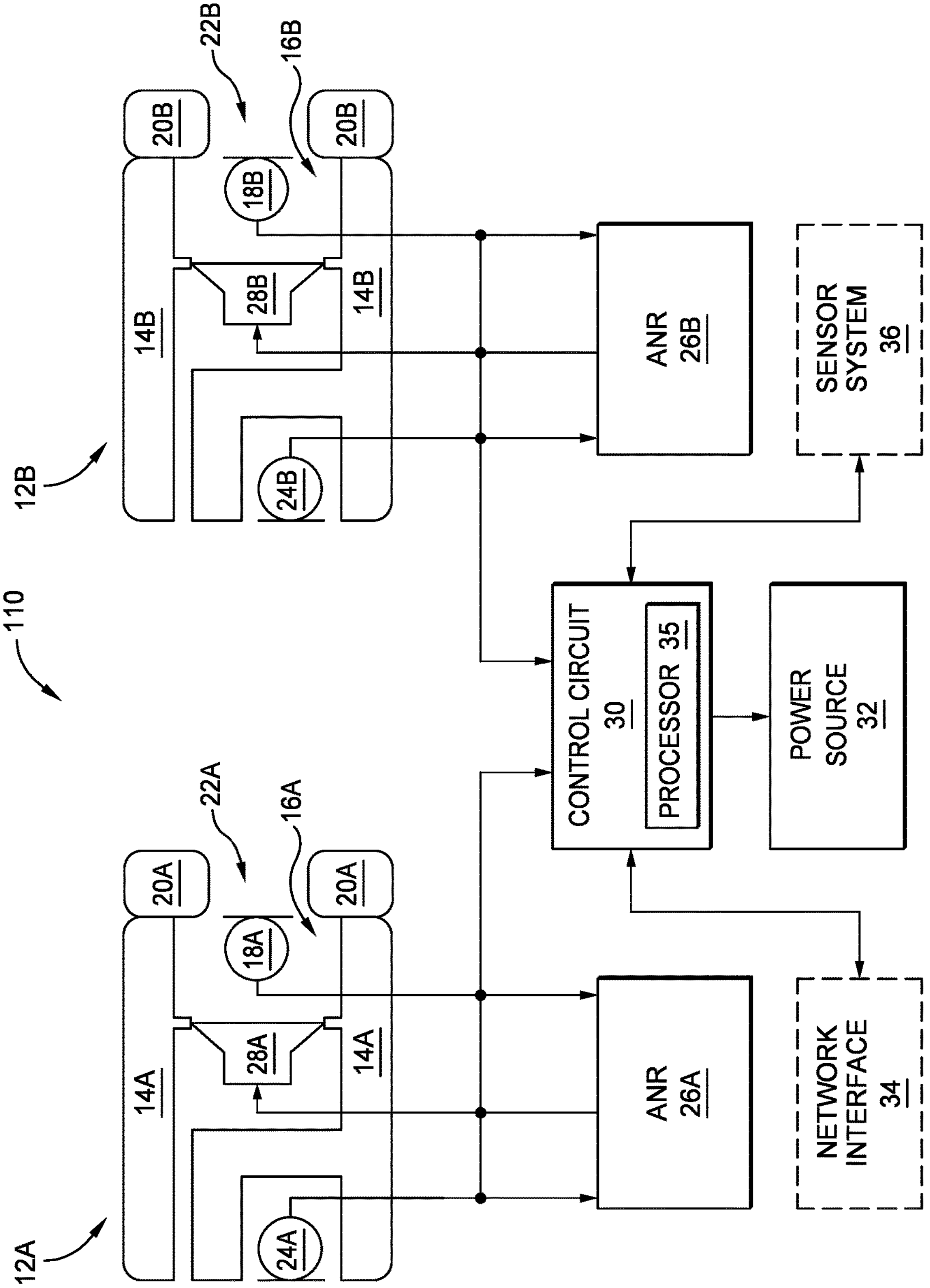
FIG. 2 illustrates an exemplary wireless audio device, in which aspects of the present disclosure may be implemented.

FIG. 2 illustrates an exemplary wearable device 110 and some of its components, in which aspects of the present disclosure may be implemented. Other components may be inherent in the wearable device 110 and not shown in FIG. 2. As shown, the wearable device 110 includes two earpieces 12A and 12B, each configured to direct sound towards an ear of the user. Reference numbers appended with an "A" or a "B" indicate a correspondence of the identified feature with a particular one of the earpieces 12 (e.g., a left earpiece 12A and a right earpiece 12B). Each earpiece 12 includes a casing 14 that defines a cavity 16. In some examples, one or more internal microphones (inner microphone) 18 may be disposed within cavity 16. In implementations where the wearable device 110 is ear-mountable, an ear coupling 20 (e.g., an ear tip or ear cushion) attached to the casing 14 surrounds an opening to the cavity 16. A passage 22 is formed through the ear coupling 20 and communicates with the opening to the cavity 16. In some examples, an outer microphone 24 is disposed on the casing in a manner that permits acoustic coupling to the environment external to the casing.

In implementations that include active noise reduction (ANR) (which may include active noise cancellation (ANC) or controllable noise canceling (CNC)), the inner microphone 18 may be a feedback microphone and the outer microphone 24 may be a feedforward microphone. In such implementations, each earpiece 12 includes an ANR circuit 26 that is in communication with the inner and outer microphones 18 and 24. The ANR circuit 26 receives an inner signal generated by the inner microphone 18 and an outer signal generated by the outer microphone 24 and performs an ANR process for the corresponding earpiece 12. The process includes providing a signal to an electroacoustic transducer 28 (e.g., speaker) disposed in the cavity 16 to generate an anti-noise acoustic signal that reduces or substantially prevents sound from one or more acoustic noise sources that are external to the earpiece 12 from being heard by the user. In addition to providing an anti-noise acoustic signal, electroacoustic transducer 28 may utilize its sound-radiating surface for providing an audio output for playback, e.g., for a continuous audio feed. According to aspects of the present disclosure, the electroacoustic transducers 28 may be configured to transmit a sequence of pulsed signals to detect the current operating state of the wearable device 110. In some cases, those pulsed signals may be pulsed ultrasonic wavelets.

In certain aspects, the wearable device 110 may also a control circuit 30. The control circuit 30 is in communication with the inner microphones 18, outer microphones 24, and electroacoustic transducers 28, and receives the inner and/or outer microphone signals. In some cases, the control circuit 30 includes a microcontroller or processor 35, including for example, a digital signal processor (DSP) and/or an advanced reduced instruction set computer (RISC) machine (ARM) chip. In some cases, the microcontroller/processor (or simply, processor) 35 may include multiple chipsets for performing distinct functions. For example, the processor 35 may include a DSP chip for performing music and voice related functions, and a co-processor such as an ARM chip (or chipset) for performing sensor related functions. According to aspects of the present disclosure, the inner microphones 18 may be configured to receive signals associated with the pulsed signals transmitted by the electroacoustic transducer 28 to detect the current operating state of the wearable device 110. The received signals may include a received signal corresponding to the pulsed signals originating from the electroacoustic transducer 28, as well as reflections associated with the pulsed signals both from within the wearable device 110 and outside of the wearable device 110.

The control circuit 30 may also include analog to digital converters for converting the inner signals from the two inner microphones 18 and/or the outer signals from the two outer microphones 24 to digital format. In response to the received inner and/or outer microphone signals, the control circuit 30 (including processor 35) may take various actions. For example, audio playback may be initiated, paused, or resumed, a notification to a user (e.g., wearer) may be provided or altered, and a device in communication with the personal audio device may be controlled. The wearable device 110 also includes a power source 32. The control circuit 30 and power source 32 may be in one or both of the earpieces 12 or may be in a separate housing in communication with the earpieces 12. The wearable device 110 may also include a network interface 34 to provide communication between the wearable device 110 and one or more audio sources or other personal audio devices (e.g., computing device 120 as illustrated in FIG. 1). The network interface 34 may be wired (e.g., Ethernet) or wireless (e.g., employ a wireless communication protocol such as IEEE 802.11, Bluetooth, Bluetooth Low Energy (BLE), or other local area network (LAN) or personal area network (PAN) protocols).

The network interface 34 is shown in phantom, as portions of the interface 34 may be located remotely from the wearable device 110. The network interface 34 may provide for communication between the wearable device 110, audio sources, and/or other networked (e.g., wireless) speaker packages and/or other audio playback devices via one or more communications protocols. The network interface 34 may provide either or both of a wireless interface and a wired interface. The wireless interface may allow the wearable device 110 to communicate wirelessly with other devices in accordance with any communication protocol noted herein. In some particular cases, a wired interface may be used to provide network interface functions via a wired (e.g., Ethernet) connection.

In certain aspects, the network interface 34 may also include a network media processor for supporting, e.g., Apple AirPlay® (a proprietary protocol stack/suite developed by Apple Inc., with headquarters in Cupertino, Calif., that allows wireless streaming of audio, video, and photos, together with related metadata between devices) or other known wireless streaming services (e.g., an Internet music service such as: Pandora®, a radio station provided by Pandora Media, Inc. of Oakland, Calif., USA; Spotify®, provided by Spotify USA, Inc., of New York, N.Y., USA); or vTuner®, provided by vTuner.com of New York, N.Y., USA); and network-attached storage (NAS) devices). For example, when a user connects an AirPlay® enabled device, such as an iPhone or iPad device, to the network, the user may then stream music to the network connected audio playback devices via Apple AirPlay®. Notably, the audio playback device can support audio-streaming via AirPlay® and/or DLNA's UPnP protocols, and all integrated within one device. Other digital audio coming from network packets may come straight from the network media processor through (e.g., through a USB bridge) to the control circuit 30. As noted herein, in some cases, the control circuit 30 may include a processor and/or microcontroller (simply, "processor" 35), which can include decoders, digital signal processors (DSPs) hardware/software, ARM processor hardware/software, etc. for playing back (rendering) audio content at electroacoustic transducers 28. In some cases, the network interface 34 may also include Bluetooth circuitry for Bluetooth applications (e.g., for wireless communication with a Bluetooth enabled audio source such as a smartphone or tablet). In operation, streamed data can pass from the network interface 34 to the control circuit 30, including the processor or microcontroller (e.g., processor 35). The control circuit 30 may execute instructions (e.g., for performing, among other things, digital signal processing, decoding, and equalization functions), including instructions stored in a corresponding memory (which may be internal to control circuit 30 or accessible via network interface 34 or other network connection (e.g., cloud-based connection). The control circuit 30 may be implemented as a chipset of chips that include separate and multiple analog and digital processors. The control circuit 30 may provide, for example, for coordination of other components of the wearable device 110, such as control of user interfaces (not shown) and applications run by the wearable device 110.

In addition to a processor and/or microcontroller, control circuit 30 may also include one or more digital-to-analog (D/A) converters for converting the digital audio signal to an analog audio signal. This audio hardware may also include one or more amplifiers which provide amplified analog audio signals to the electroacoustic transducer(s) 28, which each include a sound-radiating surface for providing an audio output for playback. In addition, the audio hardware may include circuitry for processing analog input signals to provide digital audio signals for sharing with other devices.

The memory in control circuit 30 may include, for example, flash memory and/or non-volatile random access memory (NVRAM). In some implementations, instructions (e.g., software) are stored in an information carrier. The instructions, when executed by one or more processing devices (e.g., the processor or microcontroller in control circuit 30), perform one or more processes, such as those described elsewhere herein. The instructions can also be stored by one or more storage devices, such as one or more (e.g., non-transitory) computer or machine-readable mediums (for example, the memory, or memory on the processor/microcontroller). As described herein, the control circuit 30 (e.g., memory, or memory on the processor/microcontroller) may include a control system including instructions for controlling directional audio selection functions according to various particular implementations. It is understood that portions of the control circuit 30 (e.g., instructions) could also be stored in a remote location or in a distributed location and could be fetched or otherwise obtained by the control circuit 30 (e.g., via any communications protocol described herein) for execution. The instructions may include instructions for controlling device functions based upon detected don/doff events (i.e., the software modules include logic for processing inputs from a sensor system to manage audio functions), as well as digital signal processing and equalization.

The wearable device 110 may also include a sensor system 36 coupled with control circuit 30 for detecting one or more conditions of the environment proximate wearable device 10. The sensor system 36 may include inner microphones 18 and/or outer microphones 24, sensors for detecting inertial conditions at the personal audio device, and/or sensors for detecting conditions of the environment proximate the wearable device 110, as described herein. Sensor system 36 may also include one or more proximity sensors, such as a capacitive proximity sensor or an IR sensor, and/or one or more optical sensors.

The sensors may be on-board the wearable device 110 or may be remote or otherwise wirelessly (or hard-wired) connected to the wearable device 110. As described further herein, sensor system 36 may include a plurality of distinct sensor types for detecting proximity information, inertial information, environmental information, or commands at the wearable device 10. In particular implementations, sensor system 36 may enable detection of user movement, including movement of a user's head or other body part(s). Portions of sensor system 36 may incorporate one or more movement sensors, such as accelerometers, gyroscopes and/or magnetometers and/or a single inertial measurement unit (IMU) having three-dimensional (3D) accelerometers, gyroscopes and a magnetometer.

In various implementations, the sensor system 36 can be located at the wearable device 110, e.g., where a proximity sensor is physically housed in the wearable device 110. In some examples, the sensor system 36 is configured to detect a change in the position of the wearable device 10 relative to the user's head (e.g., detect the device operating state). Data indicating the change in the position of the wearable device 110 may be used to trigger a command function, such as activating an operating mode of the wearable device 110, modifying playback of audio at the wearable device 10 (e.g., by modifying the audio, noise cancellation (e.g., ANC), or transparency of the wearable device), or controlling a power function of the personal audio device 10.

The sensor system 36 may also include one or more interface(s) for receiving commands at the wearable device 110. For example, sensor system 36 may include an interface permitting a user to initiate functions of the wearable device 110. In a particular example implementation, the sensor system 36 may include, or be coupled with, a capacitive touch interface for receiving tactile commands on the wearable device 110.

In other implementations, as illustrated in the phantom depiction in FIG. 2, one or more portions of the sensor system 36 may be located at another device capable of indicating movement and/or inertial information about the user of the wearable device 110. For example, in some cases, the sensor system 36 may include an IMU physically housed in a hand-held device such as a smart device (e.g., smart phone, tablet, etc.) a pointer, or in another wearable audio device. In particular example implementations, at least one of the sensors in the sensor system 36 may be housed in a wearable audio device distinct from the wearable device 110, such as where wearable device 110 includes headphones and an IMU is located in a pair of glasses, a watch, or other wearable electronic device.

In certain aspects, the control circuit 30 is in communication with the inner microphones 18 and receives the two inner signals. Alternatively, the control circuit 30 may be in communication with the outer microphones 24 and receive the two outer signals. In another alternative, the control circuit 30 may be in communication with both the inner microphones 18 and outer microphones 24 and receives the two inner and two outer signals. It should be noted that in some implementations, there may be multiple inner and/or outer microphones in each earpiece 12. As noted herein, the control circuit 30 may include a microcontroller or processor having a DSP and the inner signals from the two inner microphones 18 and/or the outer signals from the two outer microphones 24 are converted to digital format by analog to digital converters. In response to the received inner and/or outer signals, the control circuit 30 may take various actions. For example, the power supplied to the wearable device 110 may be reduced upon a determination that one or both earpieces 12 are off-head. In another example, full power may be returned to the device 10 in response to a determination that at least one earpiece becomes on head. Other aspects of the personal audio device 10 may be modified or controlled in response to determining that a change in the operating state of the earpiece 12 has occurred. For example, ANR functionality may be enabled or disabled, audio playback may be initiated, paused or resumed, a notification to a wearer may be altered, and a device in communication with the personal audio device may be controlled. As illustrated, the control circuit 30 generates a signal that is used to control a power source 32 for the wearable device 110. The control circuit 30 and power source 32 may be in one or both of the earpieces 12 or may be in a separate housing in communication with the earpieces 12.

When an earpiece 12 is positioned on head, the ear coupling 20 engages portions of the ear and/or portions of the user's head adjacent to the ear, and the passage 22 is positioned to face the entrance to the ear canal. As a result, the cavity 16 and the passage 22 are acoustically coupled to the ear canal. At least some degree of acoustic seal is formed between the ear coupling 20 and the portions of the ear and/or the head of the user that the ear coupling 20 engages. This acoustic seal at least partially acoustically isolates the now acoustically coupled cavity 16, passage 22 and ear canal from the environment external to the casing 14 and the user's head. This enables the casing 14, the ear coupling 20 and portions of the ear and/or the user's head to cooperate to provide some degree of passive noise reduction. Consequently, sound emitted from external acoustic noise sources is attenuated to at least some degree before reaching the cavity 16, the passage 22 and the ear canal. Sound generated by each electroacoustic transducer 28 propagates within the cavity 16 and passage 22 of the earpiece 12 and the ear canal of the user, and may reflect from surfaces of the casing 14, ear coupling 20 and ear canal. This sound can be sensed by the inner microphone 18. Thus, the inner signal is responsive to the sound generated by the electroacoustic transducer 28.

The outer signals generated by the outer microphones 24 may be used in a complementary manner. When the earpiece 12 is positioned on head, the cavity 16 and the passage 22 are at least partially acoustically isolated from the external environment due to the acoustic seal formed between the ear coupling 20 and the portions of the ear and/or the head of the user. Thus, sound emitted from the electroacoustic transducer 28 is attenuated before reaching the outer microphones 24. Consequently, the outer signals are generally substantially non-responsive to the sound generated by the electroacoustic transducer 28 while the earpiece 12 is in an on-head operating state.

When the earpiece 12 is removed from the user so that it is off head and the ear coupling 20 is therefore disengaged from the user's head, the cavity 16 and the passage 22 are acoustically coupled to the environment external to the casing 14. This allows the sound from the electroacoustic transducer 28 to propagate into the external environment. As a result, the transfer function defined by the outer signal of the outer microphone 24 relative to the signal driving the electroacoustic transducer 28 generally differs for the two operating states. More particularly, the magnitude and phase characteristics of the transfer function for the on head operating state are different from the magnitude and phase characteristics of the transfer function for the off-head operating state.

Example Operations for Wearable Device Operating State Detection

Aspects of the present disclosure provide techniques, including devices and system implementing the techniques, for detecting a current operating state of a wearable audio device of a user using pulsed signals. In certain aspects, the pulsed signals may be pulsed ultrasonic wavelets. The present disclosure may enable the user's wearable device to accurately identify the current operating state of the wearable device, to enable optimal device performance and operation.

Figure 3:
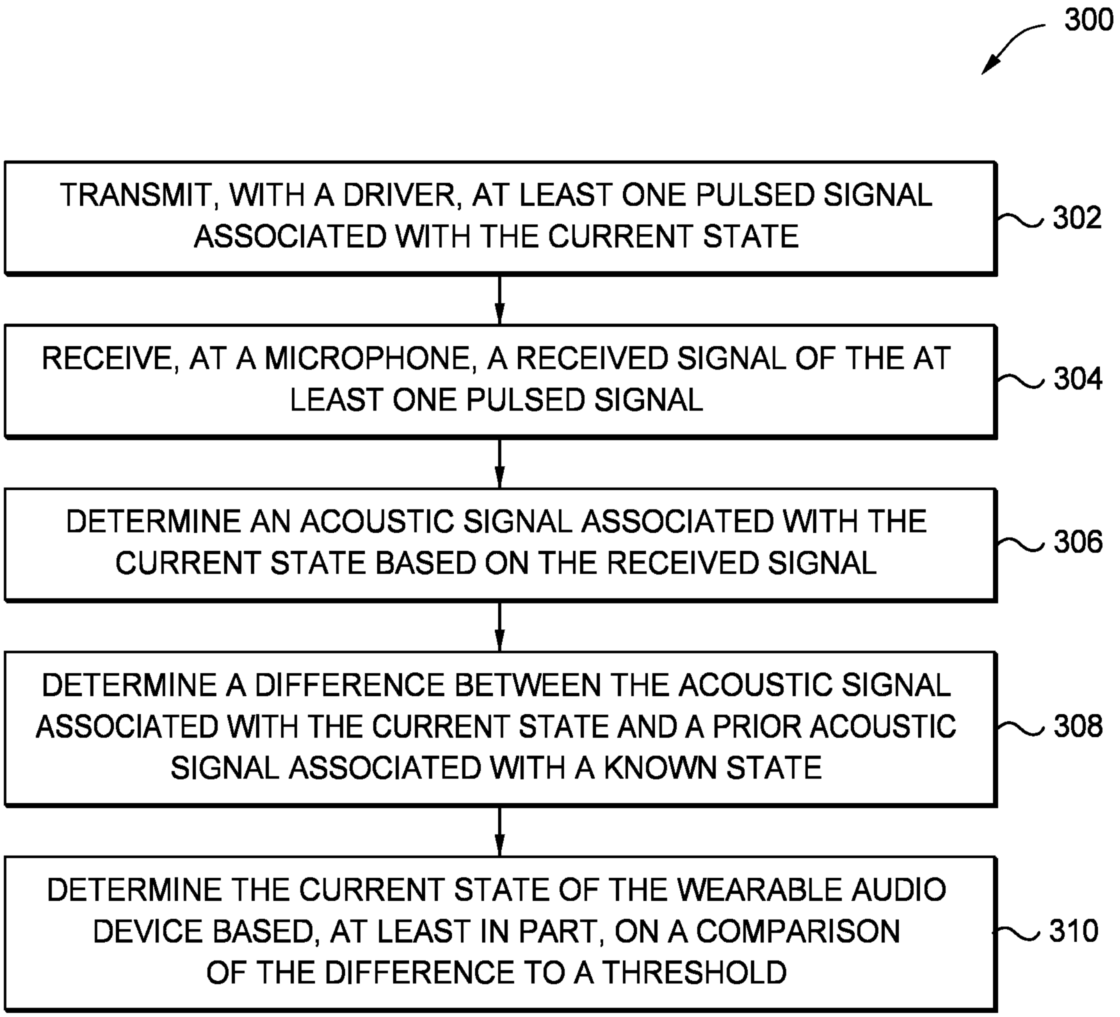
FIG. 3 illustrates example operations performed by a wearable audio device worn by a user for detecting the current operating state of the wearable device, according to certain aspects of the present disclosure.

FIG. 3 illustrates example operations 300 performed by a wearable audio device (e.g., the wearable device 110 of FIGS. 1-2) worn by a user for detecting a current operating state of the wearable device, according to certain aspects of the present disclosure.

The operations 300 may be utilized by the wearable audio device continuously, or periodically. In some cases, when the operations 300 are utilized discontinuously, the wearable audio device may only utilize the operations 300 when the wearable device has an indication that the operating state of the wearable device has changed. For example, the wearable audio device may perform operations 300 when the wearable device is powered on, when the wearable device has an indication that the device is beginning to be worn by a user (e.g., an indication from sensor system 36 illustrated in FIG. 2), or when the wearable device has an indication that the user has taken the device off (e.g., an indication from sensor system 36). In this example, the wearable audio device may utilize the operations 300 to quickly and accurately detect the current operating state of the wearable device. In some cases, the wearable audio device may use the fact that the wearable device is playing audio as an indication of the state of the device. For example, when the wearable audio device stops playing audio, the wearable device may assume that the device has been removed from the user, and operations 300 may be used to detect the current operating state. In some cases, the wearable audio device may detect the current operating state of the wearable device (e.g., continuously or periodically) with less than perfect confidence. In these cases, the operations 300 may be triggered and utilized by the wearable device to confirm the prior detected operating state. In certain aspects, operations 300 may be used to confirm the current operating state of the wearable audio device after it has already been determined (e.g., by the sensor system 36).

The operations may generally include, at block 302, transmitting, with a driver (e.g., electroacoustic transducers 28), at least one pulsed signal associated with the current state. In certain aspects, the at least one pulsed signal includes at least one pulsed ultrasonic wavelet. For example, the pulsed ultrasonic wavelet may have a frequency of 20 kHz or higher, and thus may be inaudible to the user. In certain aspects, the at least one pulsed signal may include a first pulsed signal and a second pulsed signal, and an interval between the first pulsed signal and the second pulsed signal may be configured to prevent interference to the received signal from the second pulsed signal. For example, the driver may be configured to transmit the first pulsed signal and wait for an interval of time before transmitting the second pulsed signal (e.g., the signal is pulsed at a sufficient periodicity such that the pulsed signal avoids interfering with the reflections of the pulsed signals). In certain aspects, a fundamental frequency of the at least one pulsed signal and a shape of the at least one pulsed signal in a frequency domain are known. For example, the fundamental frequency and/or shape of the at least one pulsed signal may be programmed in the wearable audio device, or may be programmed or set by a computing device (e.g., computing device 120) in communication with the wearable audio device.

According to certain aspects, the operations 300 may further include, at block 304, receiving, at a microphone (e.g., microphones 18), a received signal of the at least one pulsed signal. As described above, the received signal may include one or more signals received at the microphone corresponding to the one or more pulsed signals originating from the electroacoustic transducer 28. The received signal may also include reflections associated with the pulsed signals from within the wearable device and/or outside of the wearable device. In some aspects, the microphone may implemented as a feedback microphone. In some cases, multiple feedback microphones may be included in the device. In some aspects, the feedback microphone may be used for feedback noise cancellation.

Figure 4:
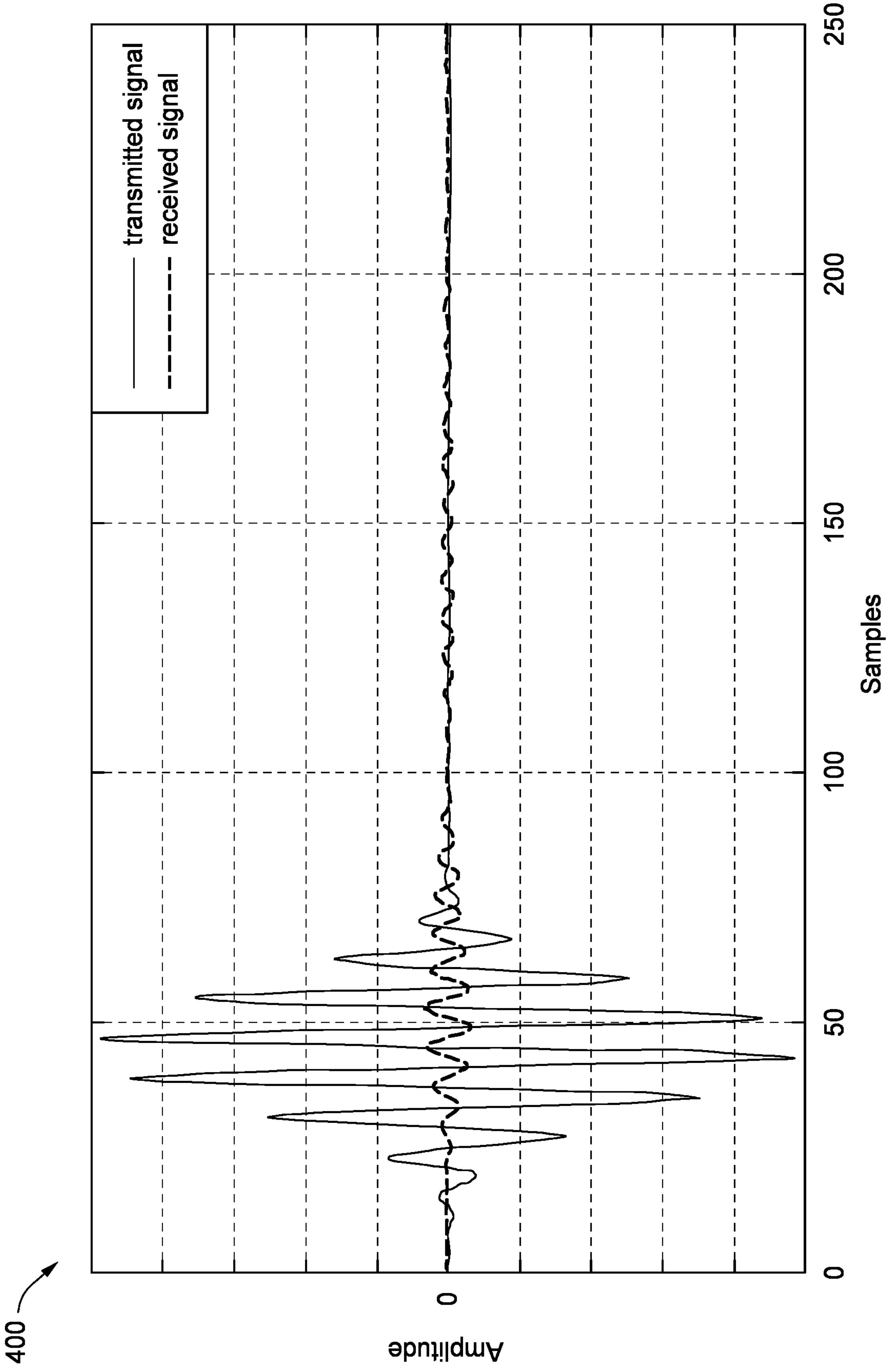
FIG. 4 provides a graph illustrating an example transmitted pulsed signal and corresponding received signal, according to certain aspects of the present disclosure.

FIG. 4 provides a graph 400 illustrating an example transmitted pulsed signal (labeled "transmitted signal") and corresponding received signal (labeled "received signal"), according to certain aspects of the present disclosure. The example transmitted pulsed signal of graph 400 represents an example of the at least one pulsed signal associated with the current state (block 302), and the example corresponding received signal represents an example received signal of the at least one pulsed signal (block 304). The graph 400 depicts the amplitude of both the transmitted signal and the received signal over a certain number of samples captured over a period of time. In the example of graph 400, the received signal is a signal of the transmitted signal that is received and measured at the microphone of the wearable device when the device is in the open-air state. When in the open-air state, the wearable device may be in the off-head state, and the passage 22 of the wearable device may not be blocked.

Figure 5:
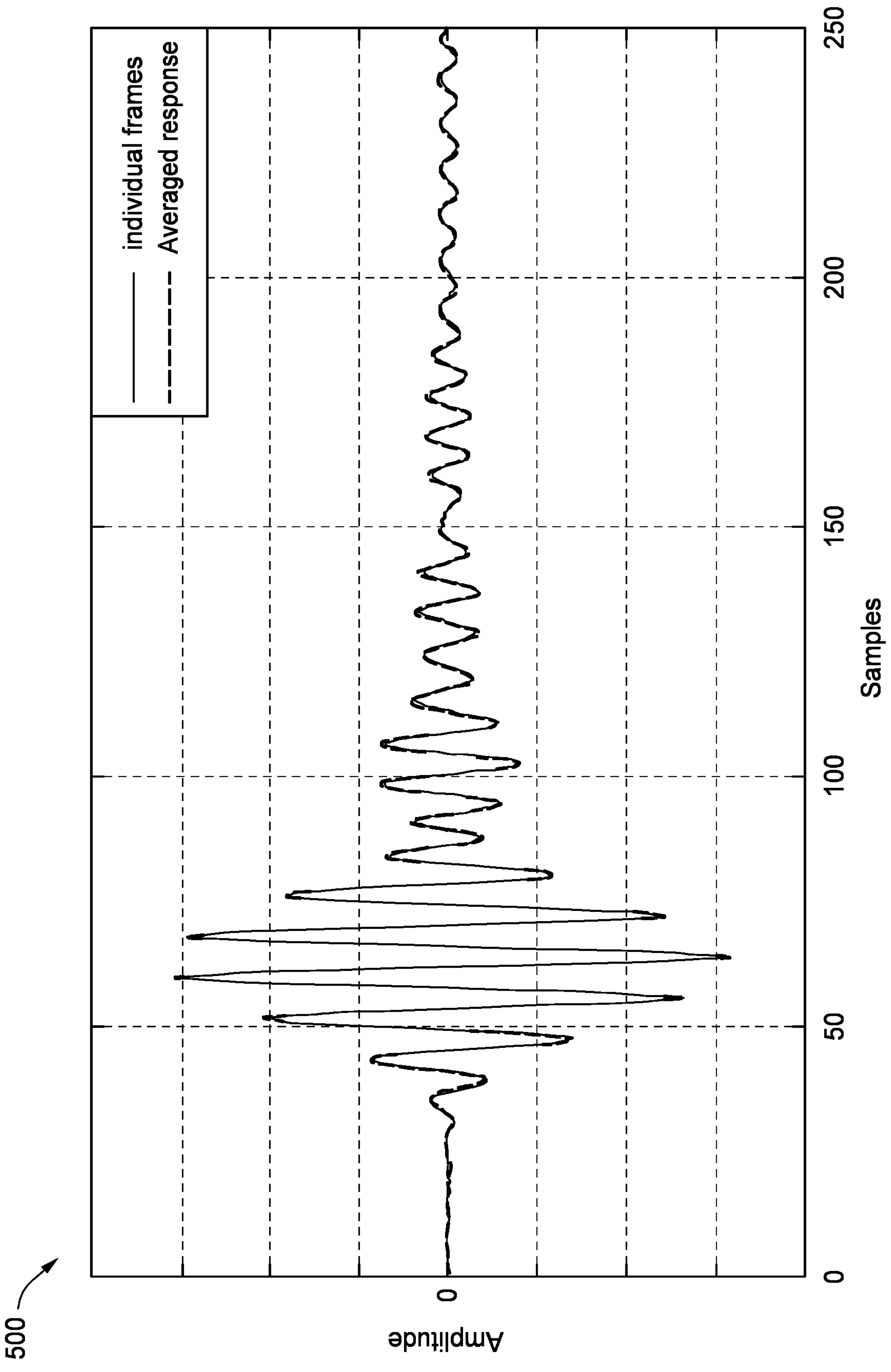
FIG. 5 provides a graph illustrating example filtering of a received signal, according to certain aspects of the present disclosure.

According to certain aspects, the operations 300 may optionally include, processing the received signal using a filter (e.g., a filter included in the ANC circuit 26 of the wearable device), the filter being configured to remove audio sound and environmental sound from the received signal. In certain aspects, processing the received signal using the filter may occur before determining the acoustic signal associated with the current state based on the received signal. FIG. 5 provides a graph 500 illustrating example filtering of a received signal, according to certain aspects of the present disclosure. The example filtered received signal of graph 500 represents an example received signal of the at least one pulsed signal (block 304). The graph 500 depicts both a number individual of frames of the received signal (labeled "individual frames") as well as the average received signal (labeled "averaged response") over a certain number of samples captured over a period of time. The received signal may be filtered (e.g., high pass filtered at 10 kHz) using the filter of the wearable audio device. The at least one filter may be implemented by one or more of a peak filter or a high-pass filter. In certain aspects, the one or more filters may be configured to remove audio sound and environmental sound including user speech, a non-speech vocalization (e.g., sneezing, crying, laughing), and/or other ambient noises and/or nearby voice from the received signal. The environmental sound may also include ultrasonic room sensors used to determine room occupancy. Thus, audio sound and environmental sound may have little to no impact on the filtered received signal caused by the transmitted pulsed signal, due to the high frequency of the received signal. As shown in FIG. 5, the curves of the individual frames are almost directly on top of each other, such that the curve of the averaged response is buried by the curves of the individual frames. As a result, the filtered received signal may be a very clean signal, even in the presence of audio sound and environmental sound that may cause problems for signals with lower frequency.

According to certain aspects, the operations 300 may further include, at block 306, determining an acoustic signal associated with the current state based on the received signal. In certain aspects, the received signal may be received during a frame, and determining the acoustic signal associated with the current state may include taking an average of the signal received during the frame and one or more prior signals received during one or more prior frames and determining the acoustic signal during only a portion of the frame based on the averaged received signal. For example, taking the average of the signal received during the frame and one or more prior received signals received during one or more prior frames may include using a single pole exponential function and/or a sliding window of frames to determine the average. The portion of the frame may be a part of the frame that is sensitive to changes in the acoustic response of the signal to optimize detection of the current state of the wearable audio device. For example, the portion of the frame may be a middle part of the signal received during the frame that is most sensitive to change in the current state of the wearable audio device (e.g., whether the device is off-head, on-head, or in another state, and/or whether the passage 22 of the device is blocked or not).

According to certain aspects, the operations 300 may further include, at block 308, determining a difference between the acoustic signal associated with the current state and a prior acoustic signal associated with a known state. In certain aspects, the wearable audio device is in the open-air state (e.g., the wearable audio device is in the off-head state and the passage 22 of the device is not blocked) in the known state. In some cases, the difference may be a root-mean-square (RMS) difference. The RMS difference may be an RMS difference as a function of time. For example, the difference may be a RMS difference between the acoustic signal associated with the current state and a prior acoustic signal associated with a known state. In certain aspects, the prior acoustic signal may be programmed in the wearable audio device or may be programmed or set by a computing device (e.g., computing device 120) in communication with the wearable audio device. The prior acoustic signal may also be a known or an acquired and offline stored acoustic signal previously transmitted from the driver and received at the microphone based on population-based data for the known state, based on data collected by wearable audio device itself, or based on any combination of the population-based data and wearable audio device data. In certain aspects, the wearable audio device may be factory calibrated to determine the prior acoustic signal associated with the known state.

According to certain aspects, the operations 300 may optionally include, determining when the current state of the wearable audio device is settled by evaluating a stability of the difference over a period of time. For example, when the wearable audio device is transitioning from one state to another (e.g., from an open-air state to an on-head state), the difference between the acoustic signal associated with the current state and the prior acoustic signal associated with the known state may be rapidly changing, indicating that the device has not yet settled into the current state. The wearable audio device may wait until the difference has been settled (e.g., when the difference is only changing slowly and/or changing very little) for a programmed or set period of time before determining the current state of the wearable audio device.

According to certain aspects, the operations 300 may further include, at block 310, determining the current state of the wearable audio device based, at least in part, on a comparison of the difference to a threshold. For example, and as stated above, the known state of the wearable audio device may be the open-air state. In this example, the operations 300 may determine that the current state of the wearable audio device is the open-air state when the acoustic signal associated with the current state and the prior acoustic signal associated with the known state closely match (e.g., when the difference between the acoustic signal associated and the prior acoustic signal is close to zero and less than the threshold). In another example, the operations 300 may determine that the current state of the wearable audio device is not the open-air state when the acoustic signal associated with the current state and the prior acoustic signal associated with the known state do not closely match (e.g., when the difference between the acoustic signal associated and the prior acoustic signal is large and more than the threshold). The value of the threshold may be programmed in the wearable audio device or may be programmed or set by a computing device (e.g., computing device 120) in communication with the wearable audio device.

Figure 6:
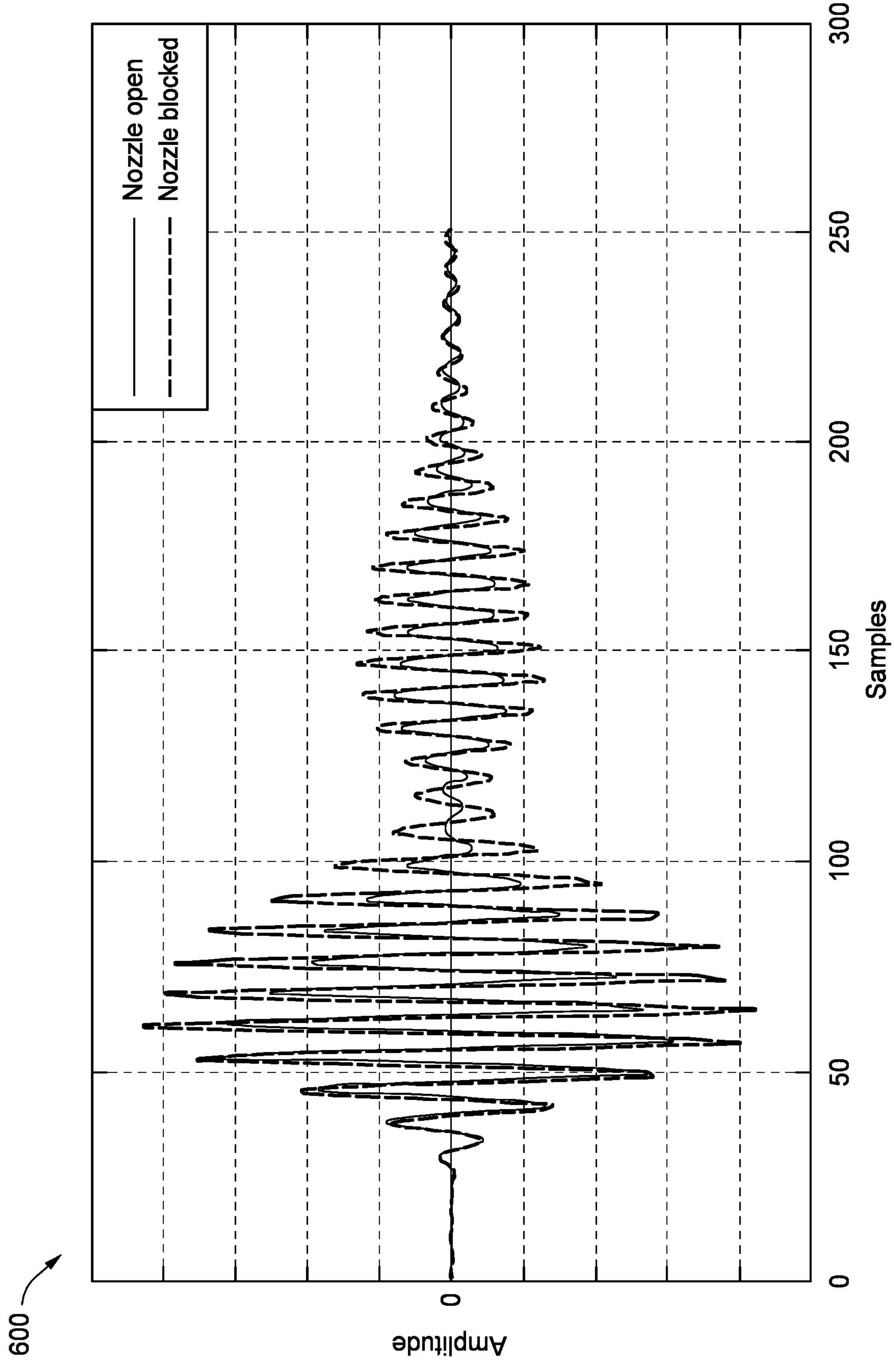
FIG. 6 provides a graph illustrating an example received signal during several conditions, according to certain aspects of the present disclosure.

FIG. 6 provides a graph 600 illustrating an example received signal during several conditions, according to certain aspects of the present disclosure. The example received signal of graph 600 represents an example acoustic signal associated with the current state based on the received signal (block 306). The graph 600 depicts both an example acoustic signal when the wearable device has a nozzle open condition (labeled "nozzle open") as well as an acoustic signal when the wearable device has a nozzle blocked condition (labeled "nozzle blocked") over a certain number of samples captured over a period of time. As shown in FIG. 6, the wearable device has a very different acoustic condition when in the nozzle open condition (e.g., when the passage 22 of the wearable device is not blocked) versus when the wearable device is in the nozzle blocked (e.g., when the passage 22 of the wearable device is blocked by the user or by something else). In certain aspects, determining the current state of the wearable audio device may include determining specific conditions associated with the current state of the wearable audio device. Determining specific conditions associated with the current state of the wearable audio device may include determining whether the wearable audio device is in a charging case and/or whether the device has an open nozzle or a closed nozzle. For example, when the difference between the acoustic signal associated with the current state and the prior acoustic signal associated with the known state is a certain level, the wearable device may determine that the wearable device is in its charging case, or that the nozzle of the wearable device is blocked.

Figure 7:
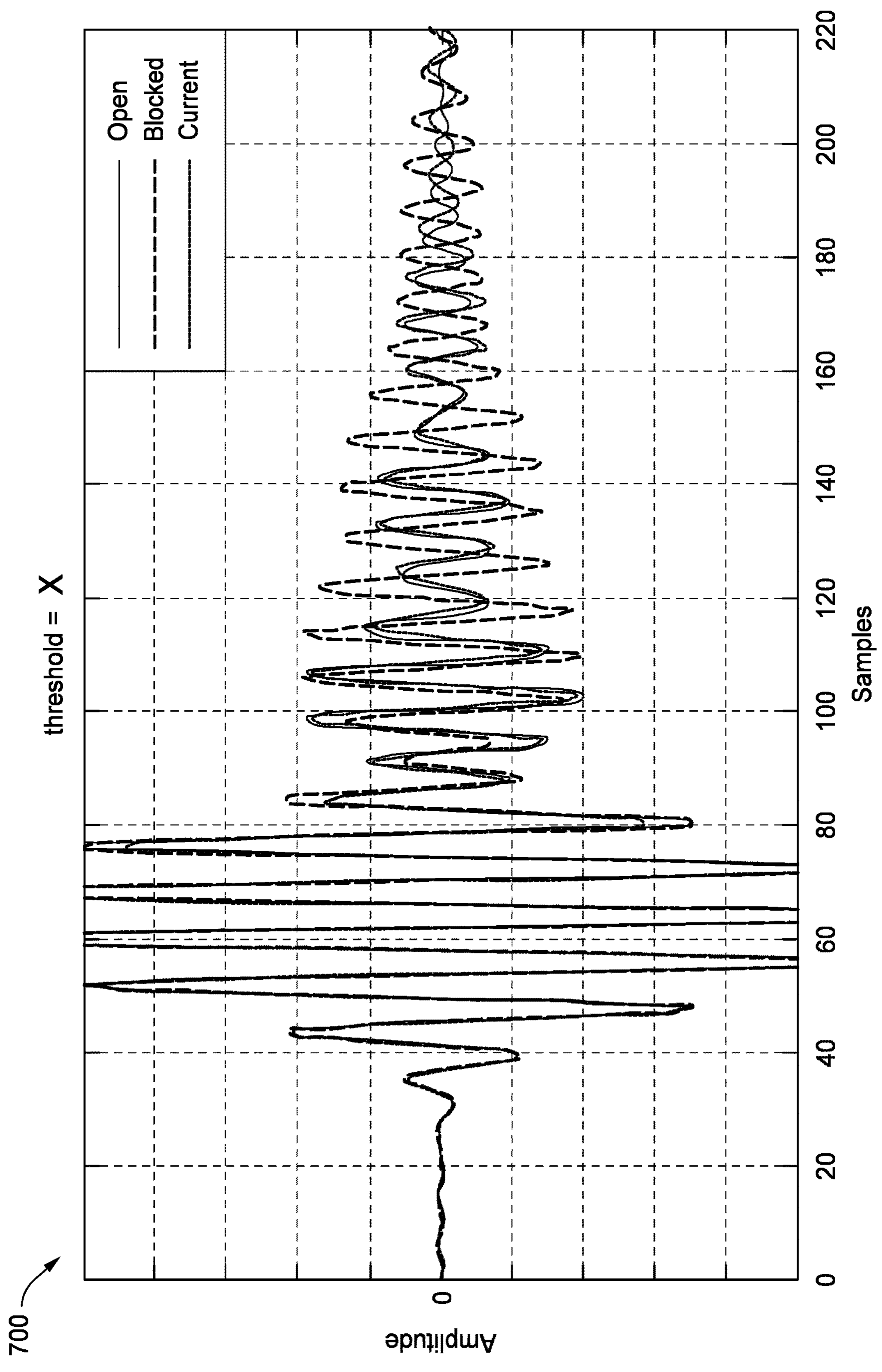
FIGS. 7 and 8 provide graphs illustrating the differences between example received signals and known signals, according to certain aspects of the present disclosure.
Figure 8:
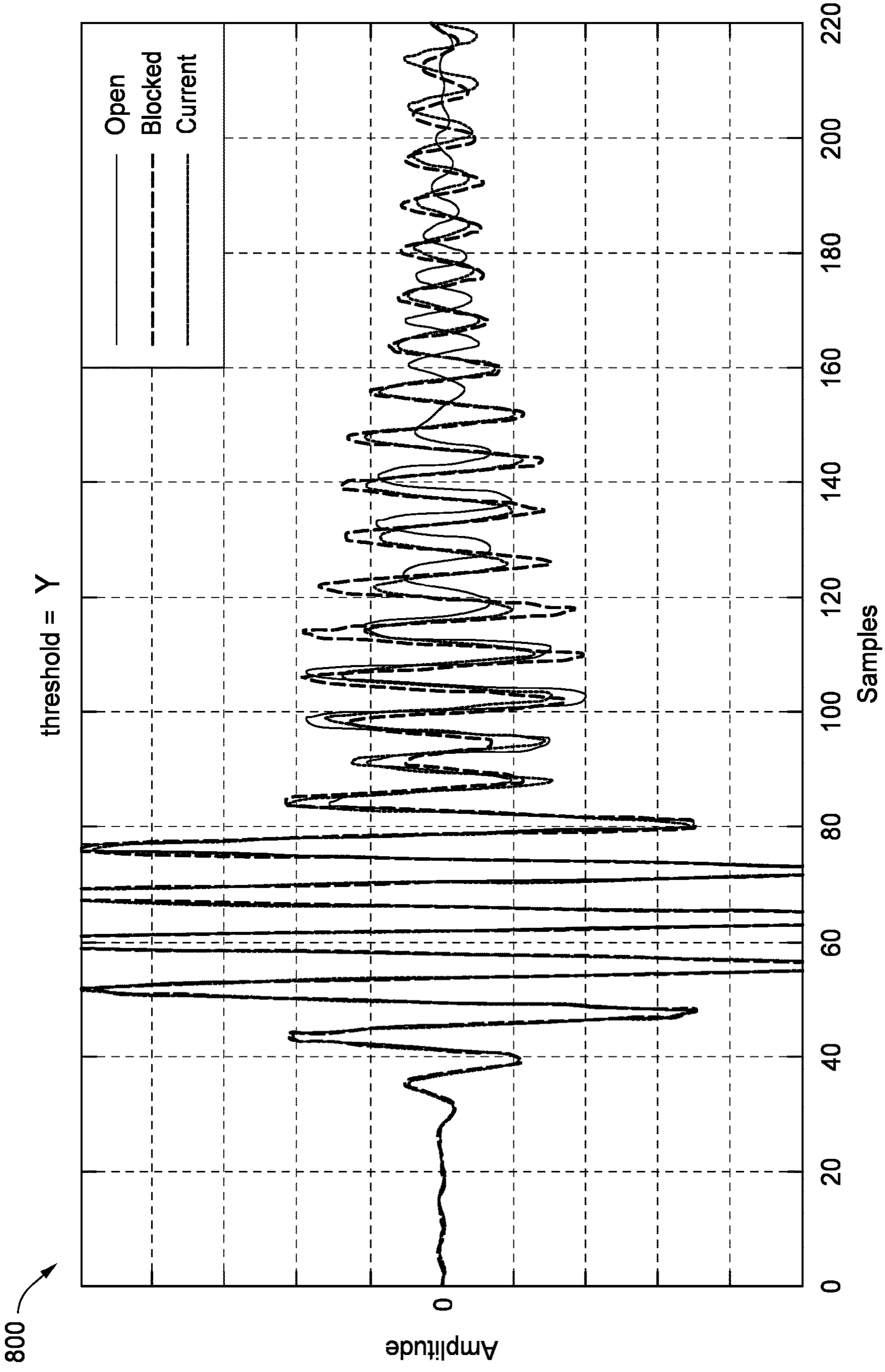

FIGS. 7 and 8 provide graphs 700, 800 illustrating the differences between example received signals and known signals, according to certain aspects of the present disclosure. The example received acoustic signals of graphs 700, 800 represents example acoustic signals associated with the current state based on the received signal (block 306), and the threshold (block 310) in the example of graphs 700, 800 is set to a value of X or Y dB, respectively. Graphs 700, 800 both depict example received acoustic signals (labeled "Current"), as well as a prior acoustic signal when the wearable device has a nozzle blocked condition (labeled "Blocked") and a prior acoustic signal when the wearable device is in an open-air state (labeled "Open") over a certain number of samples captured over a period of time. In the example of graph 700, the current state of the wearable audio device is the open-air state, so the Current curve closely matches the Open curve. In this example, the difference (e.g., a summed RMS difference as a function of time) between the Current curve (e.g., the acoustic signal associated with the current state) and the Open curve (e.g., the prior acoustic signal associated with the known state) is less than the threshold (e.g., threshold X), so the current state of the wearable audio output device may be determined to be the open-air state (e.g., the current state is the same as the known state).

In the example of graph 800, the current state of the wearable audio device is not the open-air state, so the Current curve does not closely match the Open curve. In addition, the Current curve also does not closely match the Blocked curve. In this example, the difference (e.g., a summed RMS difference as a function of time) between the Current curve (e.g., the acoustic signal associated with the current state) and the Open curve (e.g., the prior acoustic signal associated with the known state) is more than the threshold (e.g., threshold Y), so the current state of the wearable audio output device may be determined to be not the open-air state (e.g., the current state is not the same as the known state).

In some aspects, the wearable device may be implemented as a banded headset. In these aspects, the driver may be included in a first cup of the wearable device, and the microphone may be included in a second cup of the wearable device. In these aspects, the operations 300 may further include determining when there is an object between the driver and the microphone, and the determining the current state of the wearable audio device (e.g., block 310) may be further based on the determining when the object is between the driver and the microphone. For example, when the wearable device determines that the object is between the driver (e.g., in the first cup) and the microphone (e.g., in the second cup), the wearable device may be more likely to determine that the wearable device is in the on-head state. In another example, when the wearable device determines that there is no object between the driver (e.g., in the first cup) and the microphone (e.g., in the second cup), the wearable device may be more likely to determine that the wearable device is in the open-air state.

In these aspects, the operations 300 may involve the wearable device waiting for a period of time after transmitting, with the driver included in the first cup, the at least one pulsed signal associated with the current state (e.g., block 302). When, during this period of time, the wearable device does not receive, with the microphone included in the second cup, a received signal of the at least one pulsed signal (e.g., block 304), the wearable device may transmit, using the second cup, at least one additional pulsed signal associated with the current state (e.g., block 302). The wearable device may also monitor backscatter during operations 300.

In some aspects, the wearable device includes more than one microphone (e.g., feedback microphones). In these aspects, one of the one or more microphones may be selected for use in the operations 300 (e.g., at block 304). In some cases, the wearable device may include two feedback microphones, including a first feedback microphone located close a driver of the wearable device, and a second feedback microphone located a distance from the driver and being more exposed than the first feedback microphone. In these cases, the feedback microphone selected by the wearable device and used in the operations 300 at block 304 may impact the received signal. For example, the second feedback microphone may be more sensitive to surrounding background signals as a result of the position and increased exposure of the second feedback microphone. The wearable device may be configured to select the feedback microphone which enables the operations 300 to most accurately determine the current state of the wearable audio device.

It is noted that the processing related to detecting a current operating state of a wearable device as discussed in aspects of the present disclosure may be performed natively in the wearable device, by the computing device, or a combination thereof.

ADDITIONAL CONSIDERATIONS

It is noted that, descriptions of aspects of the present disclosure are presented above for purposes of illustration, but aspects of the present disclosure are not intended to be limited to any of the disclosed aspects. Many modifications and variations will be apparent to those of ordinary skill in the art without departing from the scope and spirit of the described aspects.

In the preceding, reference is made to aspects presented in this disclosure. However, the scope of the present disclosure is not limited to specific described aspects. Aspects of the present disclosure can take the form of an entirely hardware aspect, an entirely software aspect (including firmware, resident software, micro-code, etc.) or an aspect combining software and hardware aspects that can all generally be referred to herein as a "component," "circuit," "module" or "system." Furthermore, aspects of the present disclosure can take the form of a computer program product embodied in one or more computer readable medium(s) having computer readable program code embodied thereon.

Any combination of one or more computer readable medium(s) can be utilized. The computer readable medium can be a computer readable signal medium or a computer readable storage medium. A computer readable storage medium can be, for example, but not limited to, an electronic, magnetic, optical, electromagnetic, infrared, or semiconductor system, apparatus, or device, or any suitable combination of the foregoing. More specific examples of a computer readable storage medium include: an electrical connection having one or more wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium can be any tangible medium that can contain, or store a program.

The flowchart and block diagrams in the Figures illustrate the architecture, functionality and operation of possible implementations of systems, methods and computer program products according to various aspects. In this regard, each block in the flowchart or block diagrams can represent a module, segment or portion of code, which comprises one or more executable instructions for implementing the specified logical function(s). In some alternative implementations the functions noted in the block can occur out of the order noted in the figures. For example, two blocks shown in succession can, in fact, be executed substantially concurrently, or the blocks can sometimes be executed in the reverse order, depending upon the functionality involved. Each block of the block diagrams and/or flowchart illustrations, and combinations of blocks in the block diagrams and/or flowchart illustrations can be implemented by special-purpose hardware-based systems that perform the specified functions or acts, or combinations of special purpose hardware and computer instructions.

What is claimed is:

1. A method of detecting a current state of a wearable audio device of a user, the method comprising:

transmitting, with a driver, at least one pulsed signal associated with the current state;

receiving, at a microphone, a received signal of the at least one pulsed signal during a frame;

determining an average signal using the received signal received during the frame and one or more prior received signals received during one or more prior frames;

determining an acoustic signal associated with the current state during only a portion of the frame based on the average signal;

determining a difference between the acoustic signal associated with the current state and a prior acoustic signal associated with a known state; and determining the current state of the wearable audio device based, at least in part, on a comparison of the difference to a threshold.

2. The method of claim 1, wherein the at least one pulsed signal comprises at least one pulsed ultrasonic wavelet.

3. The method of claim 1, wherein the wearable audio device is in open-air in the known state.

4. The method of claim 1, further comprising:

determining when the current state of the wearable audio device is settled by evaluating a stability of the difference over a period of time.

5. The method of claim 1, further comprising:

processing the received signal using a filter, the filter being configured to remove audio sound and environmental sound from the received signal.

6. The method of claim 1, wherein:

the at least one pulsed signal comprises a first pulsed signal and a second pulsed signal; and an interval between the first pulsed signal and the second pulsed signal is configured to prevent interference to the received signal from the second pulsed signal.

7. The method of claim 1, wherein a fundamental frequency of the at least one pulsed signal and a shape of the at least one pulsed signal in a frequency domain are known.

8. The method of claim 1, wherein the difference is a root-mean-square (RMS) difference.

9. The method of claim 1, further comprising:

determining whether there is an object between the driver and the microphone, wherein:

the driver is included in a first cup of the wearable audio device;

the microphone is included in a second cup of the wearable audio device; and determining the current state of the wearable audio device is further based on whether the object is between the driver and the microphone.

10. A system, comprising:

a wearable audio device of a user, the wearable audio device including a microphone configured to measure ambient sound and including a driver; and one or more processors coupled to the wearable audio device, the one or more processors configured to:

transmit, with the driver, at least one pulsed signal associated with a current state of the wearable audio device;

receive, at the microphone, a received signal of the at least one pulsed signal during a frame;

determine an average signal using the received signal received during the frame and one or more prior received signals received during one or more prior frames;

determine an acoustic signal associated with the current state during only a portion of the frame based on the average signal;

determine a difference between the acoustic signal associated with the current state and a prior acoustic signal associated with a known state; and determine the current state of the wearable audio device based, at least in part, on a comparison of the difference to a threshold.

11. The system of claim 10, wherein the at least one pulsed signal comprises at least one pulsed ultrasonic wavelet.

12. The system of claim 10, wherein the one or more processors are further configured to determine when the current state of the wearable audio device is settled by evaluating a stability of the difference over a period of time.

13. The system of claim 10, wherein the one or more processors are further configured to process the received signal using a filter, the filter being configured to remove audio sound and environmental sound from the received signal.

14. The system of claim 10, wherein the one or more processors are further configured to determine whether there is an object between the driver and the microphone, wherein:

the driver is included in a first cup of the wearable audio device;

the microphone is included in a second cup of the wearable audio device; and determining the current state of the wearable audio device is further based on determining whether the object is between the driver and the microphone.

15. The system of claim 10, wherein:

the at least one pulsed signal comprises a first pulsed signal and a second pulsed signal; and an interval between the first pulsed signal and the second pulsed signal is configured to prevent interference to the received signal from the second pulsed signal.

16. A non-transitory computer-readable medium comprising computer-executable instructions that, when executed by one or more processors of a wearable audio device of a user, cause the wearable audio device to perform a method for detecting a current state of the wearable audio device, the method comprising:

transmitting, with a driver, at least one pulsed signal associated with the current state;

receiving, at a microphone, a received signal of the at least one pulsed signal during a frame;

determining an average signal using the received signal received during the frame and one or more prior received signals received during one or more prior;

determining an acoustic signal associated with the current state during only a portion of the frame based on the average signal;

determining a difference between the acoustic signal associated with the current state and a prior acoustic signal associated with a known state; and determining the current state of the wearable audio device based, at least in part, on a comparison of the difference to a threshold.

17. The non-transitory computer-readable medium of claim 16, wherein the at least one pulsed signal comprises at least one pulsed ultrasonic wavelet.

18. The non-transitory computer-readable medium of claim 16, wherein the method further comprises:

determining when the current state of the wearable audio device is settled by evaluating a stability of the difference over a period of time.

19. The non-transitory computer-readable medium of claim 16, wherein the method further comprises:

processing the received signal using a filter, the filter being configured to remove audio sound and environmental sound from the received signal.

20. The non-transitory computer-readable medium of claim 16, wherein the method further comprises determining whether there is an object between the driver and the microphone, wherein:

the driver is included in a first cup of the wearable audio device;

the microphone is included in a second cup of the wearable audio device; and determining the current state of the wearable audio device is further based on determining whether the object is between the driver and the microphone.

21. A method of detecting a current state of a wearable audio device of a user, the method comprising:

transmitting, with a driver, at least one pulsed signal associated with the current state;

receiving, at a microphone, a received signal of the at least one pulsed signal;

determining an acoustic signal associated with the current state based on the received signal;

determining a difference between the acoustic signal associated with the current state and a prior acoustic signal associated with a known state;

determining whether there is an object between the driver and the microphone, wherein:

the driver is included in a first cup of the wearable audio device; and the microphone is included in a second cup of the wearable audio device; and determining the current state of the wearable audio device based, at least in part, on a comparison of the difference to a threshold and whether the object is between the driver and the microphone.

* * * * *